US009758640B2

(12) United States Patent
Stockdale et al.

(10) Patent No.: US 9,758,640 B2
(45) Date of Patent: *Sep. 12, 2017

(54) PROCESS STABILIZATION OF POLYMER COMPOSITIONS COMPRISING PHOSPHOROUS CONTAINING FLAME RETARDANTS

(71) Applicant: Chemtura Corporation, Middlebury, CT (US)

(72) Inventors: Zachary D Stockdale, West Lafayette, IN (US); Larry D Timberlake, West Lafayette, IN (US); Mark V Hanson, West Lafayette, IN (US); William R Fielding, West Lafayette, IN (US)

(73) Assignee: LANXESS Solutions US Inc., Middlebury, CT (US)

( * ) Notice: Subject to any disclaimer, the term of this patent is extended or adjusted under 35 U.S.C. 154(b) by 12 days.

This patent is subject to a terminal disclaimer.

(21) Appl. No.: 14/717,573

(22) Filed: May 20, 2015

(65) Prior Publication Data

US 2016/0200897 A1 Jul. 14, 2016

Related U.S. Application Data

(60) Provisional application No. 62/101,789, filed on Jan. 9, 2015.

(51) Int. Cl.

| | | |
|---|---|---|
| *C08G 69/26* | (2006.01) | |
| *C08K 5/5333* | (2006.01) | |
| *C08K 5/5317* | (2006.01) | |
| *C08K 3/38* | (2006.01) | |
| *C08K 3/32* | (2006.01) | |
| *C09K 21/04* | (2006.01) | |

(52) U.S. Cl.
CPC ............. *C08K 5/5333* (2013.01); *C08K 3/32* (2013.01); *C08K 3/38* (2013.01); *C08K 5/5317* (2013.01); *C09K 21/04* (2013.01); *C08K 2003/329* (2013.01); *C08K 2003/387* (2013.01)

(58) Field of Classification Search
CPC ...... C08K 3/32; C08K 2003/329; C08K 5/49; C08K 5/53; C08K 5/5313; C08K 5/5317
USPC ................................................. 524/606, 115
See application file for complete search history.

(56) References Cited

U.S. PATENT DOCUMENTS

| | | | |
|---|---|---|---|
| 3,894,986 A | 7/1975 | Werner et al. | |
| 4,303,546 A * | 12/1981 | Waegerle | C02F 5/10 252/180 |
| 4,972,011 A * | 11/1990 | Richardson | C08K 5/5317 524/130 |
| 5,053,148 A | 10/1991 | von Bonin | |
| 5,780,534 A | 7/1998 | Kleiner et al. | |
| 6,013,707 A | 1/2000 | Kleiner et al. | |
| 6,255,371 B1 | 7/2001 | Schlosser et al. | |
| 6,365,071 B1 | 4/2002 | Jenewen | |
| 6,472,448 B2 | 10/2002 | Witte et al. | |
| 6,547,992 B1 | 4/2003 | Schlosser et al. | |
| 7,138,448 B2 * | 11/2006 | Kaprinidis | C08K 5/0066 524/101 |
| 7,531,585 B2 | 5/2009 | Ozawa et al. | |
| 8,445,718 B2 | 5/2013 | Suwa et al. | |
| 2006/0138391 A1 * | 6/2006 | Drewes | C08K 5/34928 252/601 |
| 2007/0029532 A1 | 2/2007 | Hansel et al. | |
| 2012/0046397 A1 * | 2/2012 | Suwa | C07F 9/3834 524/132 |
| 2014/0155527 A1 * | 6/2014 | Levchik | C08K 5/5317 524/123 |
| 2015/0031805 A1 * | 1/2015 | Stockdale | C07F 9/40 524/91 |
| 2015/0141556 A1 * | 5/2015 | Stockdale | C07F 9/5329 524/89 |
| 2015/0307690 A1 * | 10/2015 | Timberlake | C07F 9/5329 524/100 |
| 2016/0032076 A1 * | 2/2016 | Stockdale | C08K 3/32 524/100 |

FOREIGN PATENT DOCUMENTS

| | | | |
|---|---|---|---|
| DE | 3833977 | 4/1990 | |
| EP | 0343109 A1 * | 11/1989 | ............... C08K 5/09 |
| WO | 2005097894 A1 | 10/2005 | |
| WO | 2010131678 A1 | 11/2010 | |
| WO | 2012045414 | 4/2012 | |

OTHER PUBLICATIONS

Japanese Office Action dated Jun. 23, 2016 from corresponding JP Application No. 2015-539971, along with unofficial English translation, 10 pages.

* cited by examiner

*Primary Examiner* — Jane L Stanley
(74) *Attorney, Agent, or Firm* — Dilworth IP LLC

(57) ABSTRACT

Flame retardant polymer compositions comprising certain polymers, a flame retardant material obtained by heating certain phosphonic acid salts at temperatures over 200° C. and certain clays or metal compounds such as select metal borates, oxides, hydroxides, oxide hydroxides etc., are readily processed at elevated temperatures and under high stress conditions whereas similar compositions without the clays or metal compounds of the invention are prone to decomposition. For example, polyamide compositions comprising the flame retardant material obtained by heating certain phosphonic acid salts at temperatures over 200° C., hydrotalcite clays, and/or borates, oxides, hydroxides, oxide hydroxides of zinc or calcium, are highly stable to thermal processing under strenuous conditions such as high temperature extrusion.

19 Claims, No Drawings

PROCESS STABILIZATION OF POLYMER COMPOSITIONS COMPRISING PHOSPHOROUS CONTAINING FLAME RETARDANTS

This application claims benefit under 35 USC 119(e) of U.S. Provisional Application No. 62/101,789, filed Jan. 9, 2015, the disclosure of which is incorporated herein by reference.

The processing stability of polymer compositions, e.g., compositions containing polyamide, HIPS, polyester etc., that are processed under high stress conditions and comprise a flame retardant material obtained by heating phosphonic acid salts at temperatures over 200° C. is improved by the addition of select clays or metal compounds such as calcium or zinc berates, oxides, hydroxides, oxide hydroxides and the like.

BACKGROUND OF THE INVENTION

The use of flame retardant additives to polymers, such as polyolefins, polyesters, polycarbonates, polyamides, polyurethanes, epoxy resins, and other thermoplastic or thermoset polymer resins, is long known. It is also well known that the stability of the resultant flame retardant/polymer composition, for example short or long term thermal stability, stability on exposure to other environmental agents or other chemical components, etc., can be compromised depending on the resins and particular flame retardants employed. The thermal processing of polymers, e.g., thermoplastic, elastomeric or thermoset polymers often exposes a polymer composition to high temperatures under severe conditions.

For example, some polymers are processed at high temperatures, for example 200° C., 220° C., 250° C. or higher, and many known flame retardants are not suitable for use under these conditions because they are too volatile, not sufficiently thermally stable, have an adverse effect on the chemical or mechanical properties of the resin, etc. Certain organophosphorus flame retardant compounds, such as some phosphate esters, can also exhibit a plasticizing effect which may adversely affect mechanical properties of the polymers into which they are added. Some compounds are not stable in certain polymers under processing conditions, for example, some phosphates are relatively unstable to hydrolysis, which can not only deplete the flame retardant but can result in undesired formation of various phosphoric acid compounds and degradation of the resin.

Salts of phosphorus containing acids are known flame-retardant additives, for example, U.S. Pat. No. 3,894,986 discloses flame retardant thermoplastic polyesters containing alkali salts of phosphoric acids; U.S. Pat. No. 4,972,011 discloses aluminum salts of alkylphosphonic acids or monoalkyl esters of alkane-phosphonic acids, i.e., salts of compounds of formula (Ia), wherein R is for example methyl, ethyl, propyl or isopropyl etc., and R' is hydrogen, methyl, ethyl, propyl, or isopropyl.

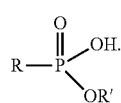

(Ia)

DE 3833977 discloses the preparation of metal salts of compounds of formula (Ia) via reactions of dimethylmethylphosphinate and metal oxides or hydroxides in water at high pressures and temperatures from 120 to 200° C. and adducts of these salts with amines such as ethylene diamine and melamine, and use of the adducts as flame retardants in thermoplastics.

Salts of phosphinic acids, i.e., compounds of formula (II) wherein $R_1$ and $R_2$ are alkyl or carbon based aromatic, are also known flame-retardant additives for thermoplastic polymers.

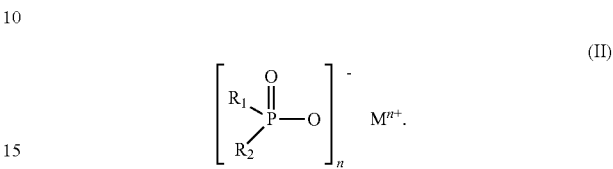

(II)

Salts wherein M is selected from Mg, Ca, Al, Sb, Sn, Ge, Ti, Zn, Fe, Zr, Ce, Bi, Li, Na, K or protonated nitrogen base are known. For example, U.S. Pat. Nos. 5,780,534 and 6,013,707 disclose that calcium phosphinates and aluminum phosphinates of Formula (II) are said to be particularly effective in polyester.

As is common with many flame retardant systems, the performance of phosphorus containing acid derivatives can be enhanced by the presence of other flame retardant agents, synergists and adjuvants. U.S. Pat. No. 6,472,448 discloses flame retardant rigid polyurethane foam wherein a combination of oxalkylated alkylphosphonic acids and ammonium polyphosphate is present as flame retardant.

U.S. Pat. No. 6,365,071 discloses a synergistic flame retardant combination for thermoplastic polymers, comprising A) a phosphinic salt of the formula (II) above and B) a nitrogen compound such as allantoin, benzoguanamine, glycoluril, urea cyanurate, melamine cyanurate and melamine phosphate.

U.S. Pat. No. 6,255,371 discloses a flame retardant combination comprising, A) a phosphinate of formula (II) above and B) condensation or reaction products of melamine e.g., melamine polyphosphate, melam polyphosphate and melem polyphosphate. U.S. Pat. No. 6,547,992 discloses a flame retardant combination for thermoplastic polymers comprising phosphinates and small amounts of inorganic and/or mineral compounds which do not contain nitrogen.

The phosphinates cited, e.g., in U.S. Pat. Nos. 6,365,071 and 6,255,371, are said to be thermally stable, however, these materials are not necessarily suitable for use in all polymer systems and may create problems for processing under more demanding conditions or may lack the flame retardant effectiveness needed for certain polymers.

The metal salts of compounds according to formula (Ia), are also reported to be thermally stable, but this is of course a relative term. As disclosed in US 2007/0029532, decomposition of such phosphonic acid salts is well known at temperatures encountered during processing of polyesters and polyamides, damaging the polymers in the process.

U.S. Pat. No. 5,053,148 discloses heat resistant foams obtained by heating metal phosphonates or metal phosphonate precursors to temperatures of above 200° C. useful, e.g., as electrical and/or heat insulation materials. Also disclosed is the use of this reaction to expand or render porous other substrates. Such substrates include, for example, thermoplastic polymers or plastics such as aromatic polyesters, polyethers, polysulfides, polyamides, polycarbonates, polyimides, polysiloxanes or polyphosphazenes, can be introduced into the foaming operation as a mixture with metal phosphonates and/or their precursors.

While U.S. Pat. No. 5,053,148 may suggest that a porous polyamide may be produced by heating a mixture of a metal phosphonate and a polyamide according to the "foaming process", nothing in U.S. Pat. No. 5,053,148 addresses or refutes the disclosure of US 2007/0029532 that decomposition of such phosphonic acid salts at high temperature gives "brittle compositions which are unusable" as an engineering thermoplastic. Outside of suggesting that a porous foam may be produced by heating metal phosphonate and a polymer such as polyamide, U.S. Pat. No. 5,053,148 contains no mention of what the properties of such an unexemplified material might be.

The difficulty of thermally processing certain thermoplastic resins in the presence of alkylphosphonic acid metal salts, and the poor physical properties of the polymer composition obtained thereby, has been confirmed by experimentation.

Copending U.S. patent application Ser. Nos. 14/337,500 and 14/592,472 disclose that products obtained by heating certain alkylphosphonic acid metal salts, such as aluminum salts, calcium salts, zinc salts etc., at temperatures in excess of 200° C. are thermally stable at temperatures above 400° C. and can be thermally incorporated into many thermoplastic polymer resins without the adverse impact on physical properties of the polymer seen with many of the salts described above. However, certain polymers containing the flame retardants of Ser. Nos. 14/337,500 and 14/592,472 that are processed under extremely harsh conditions may benefit from further process stabilization.

SUMMARY OF THE INVENTION

It has been found that the addition of certain select inorganic compounds, for example, certain metal oxides, hydroxides, oxide hydroxides, carbonates, borates, sulfides, stannates, molybdates, silicates, phosphates or carboxylates, such as metal borates, oxides, hydroxides or oxide hydroxides, to a polymer composition comprising a phosphorus containing flame retardant material obtained by heating one, or more than one, phosphonic acid salt, i.e., compounds of formula (I)

(I)

wherein R is an alkyl, aryl, alkylaryl or arylalkyl group, p is a number of from 1 to 7, e.g., from 1 to 4, e.g., 1, 2, 3 or 4, M is a metal, y is a number of from 1 to 7, e.g., from 1 to 4, e.g., 1, 2, 3 or 4, often 2 or 3, so that $M^{(+)y}$ is a metal cation where (+)y represents the charge formally assigned to the cation,
at temperatures of 200° C. or higher, e.g., 220° C. or higher, generally at temperatures of 250° C. or higher, e.g. from about 250° C. to about 400° C. or from about 260° C. to about 360° C., provides flame retardant compositions that are readily processed under high temperature processing conditions and result in polymer compositions and articles with excellent retained physical properties.

Also provided is a method for preparing flame a retardant polymer composition, which method comprises adding to a polymer resin a material obtained by heating compounds of formula (I) under conditions that chemically transform said compounds to a more thermally stable flame retardant material, e.g., a material of component (b) above, and one or more select compounds of the group consisting of metal oxides, hydroxides, oxide hydroxides, carbonates, borates, sulfides, stannates, molybdates, silicates, phosphates, days, carboxylates and complexes thereof, e.g. borates, oxides or hydroxides, of calcium or zinc, and then processing the resulting mixture at elevated temperature, e.g., by melt processing of the polymer and flame retardants at elevated temperature, such as extrusion.

DESCRIPTION OF THE INVENTION

In one broad embodiment, the invention provides a polymer composition having excellent flame retardant properties and exhibiting surprisingly good processability under demanding conditions, such as elevated temperature extrusion, without negatively impacting the physical property of the resin, for example:

A flame retardant polymer compositions comprising:
a) a thermoset or thermoplastic polymer, e.g., a thermoplastic polymer,
b) from 1% to 50%, by weight based on the total weight of the flame retardant composition, of a flame retardant material obtained by heating one, or more than one, phosphonic acid salt, i.e., compounds of formula (I)

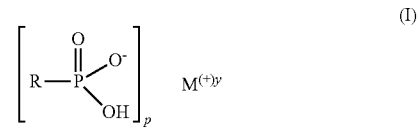

(I)

wherein R is an alkyl, aryl, alkylaryl or arylalkyl group, p is a number of from 1 to 7, e.g., from 1 to 4, e.g., 1, 2, 3 or 4, M is a metal, y is a number of from 1 to 7, e.g., from 1 to 4, e.g., 1, 2, 3 or 4, often 2 or 3, so that $M^{(+)y}$ is a metal cation where (+)y represents the charge formally assigned to the cation,
at temperatures of 200° C. or higher, e.g., 220° C. or higher, generally at temperatures of 250° C. or higher, e.g. from about 250° C. to about 400° C. or from about 260° C. to about 360° C., and
c) one or more clays, metal oxides, hydroxides, oxide hydroxides, carbonates, borates, sulfides, stannates, molybdates, silicates, phosphates, carboxylates or complexes thereof, for example, one or more compounds selected from the group consisting of hydrotalcite clays, metal borates, metal oxides and metal hydroxides, wherein the metal is zinc or calcium.

The polymer of component a) is not particularly limited, but in many embodiments of the present invention the polymer is, e.g., selected from thermoplastics such as thermoplastic polyolefins, HIPS, polyesters, polycabonates, polyamides, and the like, as well as epoxy resins and other resins with similar properties. As the flame retardant b), the materials described in copending U.S. patent application Ser. No. 14/337,500 have been shown to be highly effective. The clays and metal compounds of component c) are typically well known and commercially available materials frequently present in other polymer compositions as fillers, synergists etc., however, it has been found that certain select materials from this group are effective in stabilizing the polymer/flame retardant composition of a) and b) under demanding processing conditions. Many embodiments further comprise flame retardants, synergists, adjuvants and other common additives in addition to the components b) and c) above.

Materials useful as the flame retardant b) in the present composition can be found, e.g., in copending U.S. patent application Ser. Nos. 14/337,500 and 14/592,472, and methods for preparing the material can be found therein. These flame retardants are obtained by thermal conversion of salts of formula (I) before incorporation into the polymer composition. As shown, for example, in U.S. patent application Ser. No. 14/337,500 attempts to incorporate the compounds of formula (I) directly into polymers at elevated temperatures can cause polymer degradation. In general, the flame retardant material of b) is obtained by heating one, or more than one, phosphonic acid salt, i.e., compounds of formula (I)

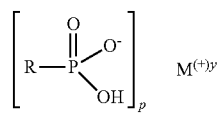  (I)

wherein R is an alkyl, aryl, alkylaryl or arylalkyl group, p is a number of from 1 to 7, e.g., from 1 to 4, e.g., 1, 2, 3 or 4, M is a metal, y is a number of from 1 to 7, e.g., from 1 to 4, e.g., 1, 2, 3 or 4, often 2 or 3, so that $M^{(+)y}$ is a metal cation where (+)y represents the charge formally assigned to the cation, at temperatures of 200° C. or higher, e.g., 220° C. or higher, generally at temperatures of 250° C. or higher, e.g. from about 250° C. to about 400° C. or from about 260° C. to about 360° C.

For example, in formula (I), $M^{(+)y}$ where y is 1 represents a mono-cation such as $Li^+$, $Na^+$ or $K^+$, $M^{(+)y}$ where y is 2 represents a di-cation such as $Mg^{++}$, $Ca^{++}$ or $Zn^{++}$ and the like, $M^{(+)y}$ where y is 3 represents a tri-cation such as $Al^{+++}$, etc. As is common with organometallic species, the formulae are idealized and the starting materials may include complex salts or salts where certain atomic valences are shared such as where a single oxygen anion is shared between two metal cations, etc. Typically, the starting salt is charged balanced, that is, a compound of formula (I) wherein p=y, e.g., when $M^{(+)y}$ is $Na^+$, p is 1, when M is $Al^{+++}$ p is 3, etc.

Not wanting to be bound by theory, analytical data suggest that the material generated by heating compounds of formula (I) at the listed temperature comprises a compound or a mixture of compounds one or more of which is believed to be generically represented by the empirical formula (IV):

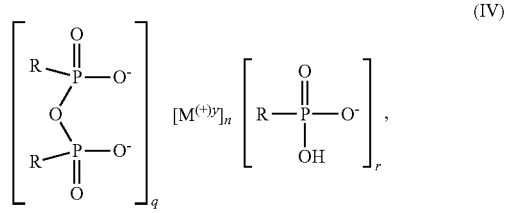  (IV)

wherein R and M are as defined for formula (I), q is a number of from 1 to 7, e.g., 1, 2 or 3, r is a number from 0 to 5, e.g., 0, 1 or 2, often 0 or 1, y is a number of from 1 to 7, e.g., from 1 to 4, e.g., 1, 2, 3, or 4, and n is 1 or 2, provided that 2(q)+r=n(y). It is believed that more than one compound is typically present in the material so generated.

The phosphonic acid salts of formula (I) are known and various methods for their preparation are described in the art. For example, US 2006/0138391 discloses compounds of formula (I) wherein R is hydrogen, $C_{1-18}$ alkyl, $C_{5-6}$ cycloalkyl, $C_{2-6}$ alkenyl, $C_{6-10}$ aryl, or $C_{7-11}$ aralkyl, which alkyl, alkenyl, aryl, or aralkyl can be unsubstituted or substituted by halogen, hydroxyl, amino, $C_{1-4}$ alkylamino, di-$C_{1-4}$ alkylamino, $C_{1-4}$ alkoxy, carboxy or $C_{2-5}$ alkoxycarbonyl; and M can be selected from, e.g., Group IA, IB, IIA, IIB, IIIA, IVA, VA or VII of the Periodic Table, for example Li, K, Na, Mg, Ca, Ba, Zn, Ge, B, Al, Cu, Fe, Sn or Sb, etc. It is noted that in US 2006/0138391 none of the compounds corresponding to the formula (I) above were heated above 200° C. or compounded into a polymer resin at elevated temperature.

In some embodiments of the invention, the salts of formula (I) comprise compounds wherein R is $C_{1-12}$ alkyl, $C_{6-10}$ aryl, $C_{7-18}$ alkylaryl, or $C_{7-18}$ arylalkyl group, wherein said groups are further substituted as described in US 2006/0138391, but often R is unsubstituted $C_{1-12}$ alkyl, $C_{6-10}$ aryl, $C_{7-18}$ alkylaryl, or $C_{7-18}$ arylalkyl. For example, R is substituted or unsubstituted, typically unsubstituted, $C_{1-6}$ alkyl, $C_6$ aryl, $C_{7-10}$ alkylaryl, or $C_{7-12}$ arylalkyl, e.g., $C_{1-4}$ alkyl, $C_6$ aryl, $C_{7-19}$ alkylaryl, or $C_{7-10}$ arylalkyl.

While in the most general embodiments of the invention $M^{(+)y}$ may be almost any metal cation, M is generally selected from Li, K, Na, Mg, Ca, Ba, Zn, Zr, Ge, B, Al, Si, Ti, Cu, Fe, Sn or Sb, for example, e.g., Li, K, Na, Mg, Ca, Ba, Zn, Zr, B, Al, Si, Ti, Sn or Sb, in many embodiments M is Li, K, Na, Mg, Ca, Ba, Zn, Zr, B, Al, Sn or Sb, and in certain embodiments M is Al, Zn or Ca. For example, excellent results are achieved when M is Al or Ca.

R as alkyl is a straight or branched chain alkyl group having the specified number of carbons and includes e.g., unbranched alky such as methyl, ethyl, propyl, butyl, pentyl, hexyl heptyl, octyl, nonyl, decyl, undecyl, dodecyl, and unbranched alkyl such as iso propyl, iso-butyl, sec-butyl, t-butyl, ethyl hexyl, t-octyl and the like. For example, R as alkyl is methyl, ethyl, propyl, iso propyl, butyl, iso butyl, sec-buty, t-butyl, often R is methyl, ethyl, propyl or isopropyl, for example methyl.

Typically when R is aryl it is phenyl or naphthyl, for example, phenyl. Examples of R as alkylaryl include phenyl substituted by one or more alkyl groups, for example groups selected from methyl, ethyl, propyl, isopropyl, butyl, iso butyl, sec-buty, t-butyl, and the like. Examples of R as arylalkyl, include for example, benzyl, phenethyl, styryl, cumyl, phenpropyl and the like. In one embodiment R is methyl, ethyl, propyl, isopropyl, phenyl or benzyl, e.g., methyl or phenyl.

In certain embodiments, e.g., the starting material is one or more compounds of formula (I) wherein R is methyl, ethyl, propyl, isopropyl, benzyl or phenyl, M is Al, Zn or Ca, and p is 2 or 3. In one particular embodiment R is methyl, ethyl, propyl, isopropyl, or phenyl, p=3 and M is Al; in another particular embodiment R is methyl, ethyl, propyl, isopropyl, or phenyl, p=2 and M is Zn or Ca, e.g., Ca.

Typically, thermal treatment of a compound of formula (I) as above generates a material comprising more than one compound, at least one of which is believed to be generically represented by the empirical formula (IV) and complex dehydration products thereof. As is common with organometallic species, the formula (IV) is idealized and the product may include polymeric salts, complex salts, salts where certain atomic valences are shared, etc.

For example, when M is aluminum, i.e., when a compound of formula (I) wherein M is Al is heated according to the Invention, elemental analysis suggests the formation of a product having an empirical formula (IV) wherein q is 1, r is 1, n is 1 and y is 3.

The flame retardant of the invention is typically a mixture of compounds. When formed from a compound of formula (I) wherein one R group and one metal is present, a mixture of compounds typically forms comprising at least one compound of formula (IV), wherein said mixture and said compound or compounds of formula (IV) comprise the one R group and the one metal. In some embodiments of the invention, the flame retardant material comprises a mixture of compounds wherein more than one R group and/or more than one metal is present, and wherein a mixture of compounds of formula (IV) comprising more than one R group and/or more than one metal are also present. Flame retardants of the invention comprising compounds containing more than one R groups and/or more than one metal can be formed in various ways.

In a first method, which can be called the intermediate salt complex method, one or more phosphonic acid compounds are treated with one or more appropriate metal compounds to give an intermediate salt complex corresponding to formula (I), which complex comprises multiple values for R and/or M. Often the metal, or at least one of the metals used in forming the Intermediate salt complex will be a bidentate or polydentate metal and more than one intermediate complex may be formed. This salt complex is then heat-treated as described above to obtain a flame retardant material comprising:
a) at least one compound corresponding to formula (IV) having more than one than one R group and/or more than one M group, and/or
b) a mixture of compounds corresponding to formula (IV) are present said mixture comprising compounds with different R groups and/or different M groups.

Alternatively, in a second method, which can be called the intimate salt mixture method, two or more metal phosphonic acid salts of formula (I) are brought together to form an intimate salt mixture comprising salts which have differing values for R and/or M. This mixture is then subjected to heat treatment described above to obtain a flame retardant material comprising:
a) at least one compound corresponding to formula (IV) having more than one than one R group and/or more than one M group, and/or
b) a mixture of compounds corresponding to formula (IV) are present said mixture comprising compounds with different R groups and/or different M groups.

A third method for obtaining flame retardant materials of the invention comprising compounds of formula (IV) having multiple values for R and/or M comprises separately heating two or more individual metal phosphonic acid salts of formula (I), which differ by having different values for R and/or M, as described above to separately obtain two or more flame retardant materials of the invention, which are subsequently mixed together to form a blended flame retardant composition.

The exact composition the mixtures obtained by the preceding three processes, i.e., the intermediate salt complex method, the intimate salt mixture method, and the blending of separately obtained flame retardant materials, will generally be different even when starting from the same phosphonic acid compounds and metals. Thus, differences in physical characteristics, stability, miscibility and performance for the products of the different methods are generally encountered.

In the broadest embodiments of the present invention, the metal of the compounds of component c) is not particularly limited and mixed metal species may be employed. Many of the compounds are commercially available materials well known to one skilled in the art. Clays useful in component c) can be natural or synthetic clays such as hydrotalcite and other layered double hydroxides, boehmite, kaolin, for example the partially dehydrated synthetic hydrotalcite DHT-4A.

It is to be expected that the exact clay, metal compound, or combination thereof, may vary depending on the specific polymer resin chosen. In particular embodiments component c) is one or more compounds selected from hydrotalcites such as DHT-4, metal borates, metal oxides and metal hydroxides wherein the metal is zinc or calcium. Often, a composition of the invention will comprise both a clay and a zinc or calcium borate, oxide or hydroxide.

For example, excellent results have been obtained in glass filled polyamide compositions comprising zinc borate, calcium oxide or calcium hydroxide. These particular materials may also prove valuable in other resins, e.g., polyesters, epoxy resins, etc., but it would not be surprising if the optimum materials for particular resin formulation vary depending on the resin. The optimal choice for the stabilizing component c) can be ascertained by the practitioner in light of this disclosure following standard laboratory protocols.

The polymer of flame retardant composition of the present invention may be any polymer known in the art, such as polyolefin homopolymers and copolymers, rubbers, polyesters, epoxy resins, polyurethanes, polyalkylene terephthalates, polysulfones, polyimides, polyphenylene ethers, styrenic polymers and copolymers, polycarbonates, acrylic polymers, polyamides, polyacetals, epoxy resins and biodegradable polymers. Mixtures of different polymers, such as polyphenylene ether/styrenic resin blends, polyvinyl chloride/ABS or other impact modified polymers, such as methacrylonitrile and α-methylstyrene containing ABS, and polyester/ABS or polycarbonate/ABS and polyester plus some other impact modifier may also be used. Such polymers are available commercially or made by means well known in the art.

Particular embodiments are to compositions comprising thermoplastic polymers that are processed and/or used at high temperatures, for example, styrenic polymers including HIPS, polyolefins, polyesters, polycarbonates, polyamides, polyurethanes, polyphenylene ethers and the like.

For example, the polymer may be a polyester-series resin, a styrenic resin, a polyamide-series resin, a polycarbonate-series resin, a polyphenylene oxide-series resin, a vinyl-series resin, an olefinic resin, an acrylic resin, epoxy resin, or a polyurethane. The polymer can be a thermoplastic or a thermoset resin and may be reinforced, e.g., glass reinforced. More than one polymer resin may be present. In particular embodiments the polymer is an engineering polymer, e.g., a thermoplastic or reinforced thermoplastic polymer, e.g., glass reinforced thermoplastic polymer, such as an optionally glass filled polyester, epoxy resin or polyamide, for example, a glass-filled polyester such as a glass filled polyalkylene terephthalate, or a glass filled polyamide.

Polyester-series resins include homopolyesters and copolyesters obtained by, for example, polycondensation of a dicarboxylic acid component and a diol component, and polycondensation of a hydroxycarboxylic acid or a lactone component, for example, aromatic saturated polyester-series resin, such as polybutylene terephthalate or polyethylene terephthalate.

Polyamide-series resins include polyamides derived from a diamine and a dicarboxylic acid; polyamides obtained from an aminocarboxylic acid, if necessary in combination with a diamine and/or a dicarboxylic acid; and polyamides derived from a lactam, if necessary in combination with a diamine and/or a dicarboxylic acid. The polyamide also includes a copolyamide derived from at least two different kinds of polyamide constituent components. Examples of polyamide-series resins include aliphatic polyamides such as nylon 46, nylon 6, nylon 66, nylon 610, nylon 612, nylon 11 and nylon 12, polyamides obtained from an aromatic dicarboxylic acid, e.g., terephthalic acid and/or isophthalic acid, and an aliphatic diamine, e.g., hexamethylenediamine or nonamethylenediamine, and polyamides obtained from both aromatic and aliphatic dicarboxylic acids, e.g., both terephthalic acid and adipic acid, and an aliphatic diamine, e.g., hexamethylenediamine, and others. These polyamides may be used singly or in combination.

In one embodiment of the invention, the polymer comprises a polyamide that melts or is typically processed at high temperatures, e.g., 280° C. or higher, 300° C., or higher, in some embodiments 320° C. or higher, e.g. 340° C. or higher. Examples of polyamides with melting points of 280° C. or higher include thermoplastic resins such as nylon 46, nylon 4T; polyamide MXD,6; polyamide 12,T; polyamide 10,T; polyamide 9,T; polyamide 6,T/6,6; polyamide 6,T/D, T; polyamide 6,6/6,T/6,I and polyamide 6/6,T and the like.

The concentration of the flame retardant b) and component c) in the polymer composition is of course dependent on the exact chemical composition of the flame retardant, the polymer and other components found in the final polymer composition. For example, flame retardant b) may be present in a concentration of from about 1 to about 50%, e.g., 1 to 30%, by weight of the total weight of the final composition. Typically there will be at least 2% of flame retardant b) present, for example 3% or more, 5% or more, 10% or more, 15% or more, 20% or more or 25% or more. In many embodiments, flame retardant b) is present in amounts up to 45%, while in other embodiments, the amount of inventive flame retardant is 40% of the polymer composition or less, e.g., 35% or less. Obviously, when used in combination with other flame retardants or flame retardant synergists, less of flame retardant b) should be needed.

Component c) is present in an amount that provides the desired improvement in processing and physical properties of the composition. In some compositions only a small amount of component c) will necessary, e.g., 1%, 2%, 3%, 4% or 5% based on the total weight of the composition, in other embodiments, 10%, 15%, 20%, 25% or more may be employed.

Any known compounding techniques may be used to prepare the flame retardant polymer composition of the Invention, for example, components b) and c) may be introduced into molten polymer by blending, extrusion, fiber or film formation etc. In some cases, one or both of b) and c) is introduced into the polymer at the time of polymer formation or curing, for example, added to a polyurethane prepolymer prior to crosslinking or added to a polyamine or alkyl-polycarboxyl compound prior to polyamide formation, or to an epoxy mixture prior to cure.

In one particular embodiment, a masterbatch comprising a polymer, components b), c) and other optional additives such as additional flame retardants, synergists, adjuvants etc. is prepared and then the masterbatch is compounded into additional polymer and other optional components. For example, a masterbatch comprising 100 parts polyamide, 130 parts flame retardant b), 45 parts of an additional flame retardant such as the commercially available EXOLIT OP 1230 (from Clariant containing aluminum diethoxy phosphinate salt), and 18 parts zinc borate is prepared and then let down on an extruder with additional polyamide plus glass fiber to obtain a processed stabilized, flame retardant glass filled polyamide.

In many embodiments the flame retardant polymer composition according to the invention comprises (a) the polymer, (b) the flame retardant, (c) the stabilizing clay or metal compound, and (d) one or more additional flame retardants, and/or one or more synergists or flame retardant adjuvants, which include, for example, other flame retardants such as halogenated flame retardants, alkyl or aryl phosphine oxide flame retardants, alkyl or aryl phosphate flame retardants, alkyl or aryl phosphonates, alkyl or aryl phosphinates, and salts of alkyl or aryl phosphinic acid, e.g., an aluminum tris(dialkytphosphinate) such as aluminum tris(diethylphosphinate), and synergists or adjuvants such as for example, carbon black, graphite, carbon nanotubes, silicones; polyphenylene ether (PPE), phosphine oxides and polyphosphine oxides, e.g., benzylic phosphine oxides, poly benzylic phosphine oxides and the like;

melamine, melamine derivatives and condensation products, melamine salts such as, but not limited to, melam, melem, melon, melamine cyanurate, melamine borate, melamine phosphates, melamine metal phosphates, and the like;

inorganic compounds added in addition to those of component c) including clays, metal salts such as hydroxides, oxides, oxide hydrates, borates, carbonates, sulfates, phosphates, phosphites, hypophosphites, silicates, mixed metal salts, etc., e.g., talc and other magnesium silicates, calcium silicate, aluminosilicate, aluminosilicate as hollow tubes (DRAGONITE), calcium carbonate, magnesium carbonate, barium sulfate, calcium sulfate, HALLOYSITE or boron phosphate, calcium molybdate, exfoliated vermiculite, zinc stannate, zinc hydroxystannate, zinc sulfide, zinc molybdate (KEMGARD 911A/B), zinc phosphate (KEMGARD 981), magnesium oxide or hydroxide, aluminum oxide, aluminum oxide hydroxide (Boehmite), aluminum trihydrate, silica, tin oxide, antimony oxide (III and V) and oxide hydrate, titanium oxide, zirconium oxide and/or zirconium hydroxide and the like.

Unless otherwise specified, in the context of the present application, the term "phosphate" when used as a component in a "phosphate salt", such as in metal phosphate, melamine phosphate, melamine metal phosphate, etc., refers to a phosphate, hydrogen phosphate, dihydrogen phosphate, pyrophosphate, polyphosphate, or a phosphoric acid condensation products anion or polyanion.

Likewise, unless otherwise specified, in the context of the present application, the term "phosphite" when used as a component in a "phosphite salt", such as in metal phosphite, etc., refers to a phosphite or hydrogen phosphite.

For example, particular embodiments of the invention include compositions comprising A flame retardant polymer composition comprising:
a) a thermoset or thermoplastic polymer;
b) from 1% to 50%, by weight based on the total weight of the flame retardant polymer composition, of a flame retardant material obtained by a process comprising heating at temperatures of about 200° C. or higher from about 0.01 hour to about 20 hours one or more than one compound of formula (I)

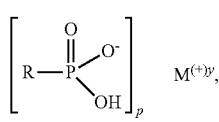

wherein
R is $C_{1-12}$ alkyl, $C_{6-10}$ aryl, $C_{7-18}$ alkylaryl, or $C_{7-18}$ arylalkyl, wherein said alkyl, aryl, alkylaryl, or arylalkyl are unsubstituted or are substituted by halogen, hydroxyl, amino, $C_{1-4}$ alkylamino, di-$C_{1-4}$ alkylamino, $C_{1-4}$ alkoxy, carboxy or $C_{2-5}$ alkoxycarbonyl;
M is a metal,
y is a number of from 1 to 4 so that $M^{(+)y}$ is a metal cation where (+)y represents the charge formally assigned to the cation, and p is a number of from 1 to 4;
c) one or more compounds selected from the group consisting of hydrotalcite clays, metal borates, metal oxides and metal hydroxides, wherein the metal is zinc or calcium; and
d) one or more additional flame retardants, one or more synergists and/or one or more flame retardant adjuvants, for example, one or more compounds such as halogenated flame retardants, alkyl or aryl phosphate flame retardants, alkyl or aryl phosphonates, alkyl or aryl phosphinates, and salts of alkyl or aryl phosphinic acids, e.g., an aluminum tris(dialkylphosphinate) such as aluminum tris(diethylphosphinate), carbon black, graphite, carbon nanotubes, silicones; polyphenylene ether (PPE), phosphine oxides and polyphosphine oxides, e.g., benzylic phosphine oxides, poly benzylic phosphine oxides and the like, melamine, melamine derivatives and condensation products, melamine salts such as, melam, melem, melon, melamine cyanurate, melamine borate, melamine phosphates, melamine metal phosphates, and the like; clays other than hydrotalcites, metal salts such as hydroxides, oxides, oxide hydrates, borates wherein the metal is other than zinc or calcium, carbonates, sulfates, phosphates, phosphites, hypophosphites, silicates, mixed metal salts etc., e.g., talc and other magnesium silicates, calcium silicate, aluminosilicate, aluminosilicate as hollow tubes (DRAGONITE), calcium carbonate, magnesium carbonate, barium sulfate, calcium sulfate, HALLOYSITE or boron phosphate, calcium molybdate, exfoliated vermiculite, zinc stannate, zinc hydroxystannate, zinc sulfide, zinc molybdate (KEMGARD 911A/B), zinc phosphate (KEMGARD 981), magnesium oxide or hydroxide, aluminum oxide, aluminum oxide hydroxide (Boehmite), aluminum trihydrate, silica, tin oxide, antimony oxide (III and V) and oxide hydrate, titanium oxide, zirconium oxide and/or zirconium hydroxide and the like.

In some particular embodiments the flame retardant polymer composition comprises one or more synergists or flame retardant adjuvants selected from, e.g., melamine, melamine derivatives and condensation products, melamine salts, phosphine oxides and polyphosphine oxides; metal hydroxides, oxides, oxide hydrates, borates wherein the metal is other than zinc or calcium; phosphates, phosphites, silicates and the like, e.g. aluminum hydrogen phosphite, melem, melam, melon, or a melamine metal phosphate, e.g., a melamine metal phosphate wherein the metal comprises aluminum, magnesium or zinc.

In particular embodiments the one or more additional flame retardant, synergist or flame retardant adjuvant comprises an aluminum tris(dialkylphosphinate) such as aluminum tris(diethylphosphinate), aluminum hydrogen phosphite, methylene-diphenylphosphine oxide-substituted polyaryl ether, xylylenebis(diphenylphosphine oxide), 4,4'-bis(diphenylphosphinylmethyl)-1,1'-biphenyl, ethylene bis-1,2-bis-(9,10-dihydro-9-oxy-10-phosphaphenanthrene-10-oxide)ethane, melem, or dimelamine zinc pyrophosphate.

When present, an additional flame retardant, synergist or adjuvant d) is present in a range of 100:1 to 1:100 by weight of flame retardant b) to the total weight of additional flame retardant, synergist and adjuvant. Depending on the additional flame retardant, synergist or adjuvant, excellent results can be obtained using a range of 10:1 to 1:10 by weight of flame retardant b) to additional flame retardant, synergist and/or adjuvant, for example, weight ratios ranging from 7:1 to 1:7, 6:1 to 1:6, 4:1 to 1:4, 3:1 to 1:3 and 2:1 to 1:2 are used to good benefit.

The flame retardant polymer composition of the invention will also typically contain one or more of the common stabilizers or other additives frequently encountered in the art such as phenolic antioxidants, hindered amine light stabilizers (HALS), the ultraviolet light absorbers, phosphites, phosphonites, alkaline metal salts of fatty acids, hydrotalcites, epoxidized soybean oils, the hydroxylamines, the tertiary amine oxides, lactones, thermal reaction products of tertiary amine oxides, thiosynergists, basic co-stabilizers, for example, melamine, melem etc., polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example, Ca stearate, calcium stearoyl lactate, calcium lactate, Zn stearate, Zn octoate, Mg stearate, Na ricinoleate and K palmitate, antimony pyrocatecholate or zinc pyrocatecholate, nucleating agents, clarifying agents, etc.

Other additives may also be present, for example, plasticizers, lubricants, emulsifiers, pigments, dyes, optical brighteners, other flameproofing agents, anti-static agents, blowing agents, anti drip agents, e.g., PTFE, and the like.

Optionally the polymer may include fillers and reinforcing agents including metal compounds and clays other than those selected as component c) of the invention, for example, calcium carbonate, silicates, glass fibers, talc, kaolin, mica, barium sulfate, metal oxides and hydroxides, carbon black and graphite. Such fillers and reinforcing agents may often be present at relatively high concentrations, including formulations where the filler or reinforcement is present in concentrations of over 50 wt % based on the weight of the final composition. More typically, fillers and reinforcing agents are present from about 5 to about 50 wt %, e.g., about 10 to about 40 wt % or about 15 to about 30 wt % based on the weight of the total polymer composition.

Processing various flame retardant polymer compositions at high temperatures and/or under high mechanical stress can lead to degradation of flame retardant and/or polymer producing a final composition with poor properties. The addition of component c) of the invention to a polymer composition comprising the phosphorus containing flame retardant of component b), stabilizes the polymer flame retardant composition under the stresses of high temperature processing providing compounded flame retardant polymer compositions and articles smoothly with high retention of desired physical properties.

EXAMPLES

Comparative Example 1

Compounding a blend of 100 parts polyamide 66, 26.8 parts of the flame retardant obtained by heat treatment of aluminum tris(methylphosphonate) at 280° C. according to U.S. patent application Ser. No. 14/337,500, 9.7 parts EXOLIT OP 1230 and 0.3 parts LUWAX OP on a Leistriz 18 mm twin screw extruded, to which 58.6 parts glass was added downstream in an attempt to prepare a 30% glass-reinforced formulation, resulted in polymer degradation characterized by an increase in back pressure, off-gassing, discoloration, swelling and the formation of a tough material.

Example 1

A masterbatch of 100 parts polyamide 66, 132.4 parts of the flame retardant obtained by heat treatment of aluminum tris(methylphosphonate) at 280° C. according to U.S. patent application Ser. No. 14/337,500, 44.1 parts EXOLIT OP 1230 and 17.6 parts zinc borate was prepared using a Hake Rheocord 90. 100 parts of this masterbatch was subsequently let down with 133.8 parts polyamide 66 on a Leistriz 18 mm twin screw extruder with 100.2 parts glass added downstream to successfully provide a 30% glass-reinforced polyamide formulation as a white material that stranded well.

Example 2

Compounding a mixture of polyamide 66, glass, the flame retardant obtained by heat treatment of aluminum tris(ethylphosphonate) at 280° C. according to U.S. patent application Ser. No. 14/337,500, EXOLIT OP 1230 and a compound selected from zinc borate, zinc oxide, calcium oxide and calcium hydroxide using a Leistriz 18 mm twin screw extruder produces a 30% glass-reinforced polyamide.

Attempts to repeat Example 2 with a mixture excluding the zinc borate, zinc oxide, calcium oxide or calcium hydroxide lead to decomposition of the polymer formulation.

What is claimed:

1. A flame retardant polymer composition comprising:
a) a thermoset or thermoplastic polymer;
b) from 1% to 50%, by weight based on the total weight of the flame retardant polymer composition, of a flame retardant material comprising one or more compounds of empirical formula (IV)

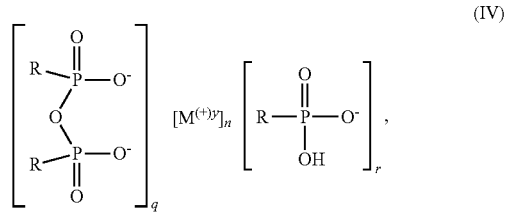

wherein
R is $C_{1-12}$ alkyl, $C_{6-10}$ aryl, $C_{7-18}$ alkylaryl, or $C_{7-18}$ arylalkyl, wherein said alkyl, aryl, alkylaryl, or arylalkyl are unsubstituted or are substituted by halogen, hydroxyl, amino, $C_{1-4}$ alkylamino, di-$C_{1-4}$ alkylamino, $C_{1-4}$ alkoxy, carboxy or $C_{2-5}$ alkoxycarbonyl;
M is a metal,
y is a number of from 1 to 4 so that $M^{(+)y}$ is a metal cation where (+)y represents the charge formally assigned to the cation, q is 1, 2 or 3, n is 1 or 2, r is 0, 1 or 2 provided that 2(q)+r=n(y);

wherein the flame retardant material is obtained by thermal conversion of salts of formula (I) before incorporation into the polymer by a process comprising heating at temperatures higher than 200° C. for from about 0.01 hour to about 20 hours one or more than one compound of formula (I)

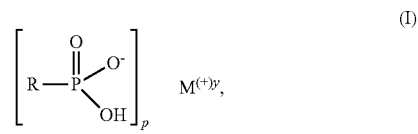

wherein R, M and y are as defined above and p is a number of from 1 to 4; and
c) one or more compounds selected from the group consisting of hydrotalcite clays, metal borates, metal oxides and metal hydroxides.

2. The flame retardant polymer composition according to claim 1 wherein the metal of the metal borates, metal oxides and metal hydroxides is zinc or calcium.

3. The flame retardant polymer composition according to claim 2 comprising one or more additional flame retardants, one or more synergists and/or one or more flame retardant adjuvants selected from the group consisting of halogenated flame retardants, alkyl phosphine oxide flame retardants, aryl phosphine oxide flame retardants, alkyl phosphate flame retardants, aryl phosphate flame retardants, alkyl aryl phosphonates, aryl phosphonates, alkyl phosphinates, aryl phosphinates, salts of alkyl phosphinic acid, salts of aryl phosphinic acid, carbon black, graphite, carbon nanotubes, silicones, polyphenylene ether, melamine, melamine derivatives, melamine condensation products, melamine salts, metal hydroxides, oxides, oxide hydrates and borates wherein the metal is other than zinc or calcium, carbonates, sulfates, sulfides, phosphates, phosphites, carboxylates, hypophosphites, silicates, and mixed metal salts.

4. The flame retardant polymer composition according to claim 3 wherein the one or more additional flame retardants, one or more synergists and/or one or more flame retardant adjuvants is selected from the group consisting of benzylic phosphine oxides, poly benzylic phosphine oxides, melamine, melam, melem, melon, melamine cyanurate, melamine borate, melamine phosphates, melamine metal phosphates, talc, calcium silicate, aluminosilicate, aluminosilicate as hollow tubes, magnesium carbonate, barium sulfate, boron phosphate, exfoliated vermiculite, magnesium oxide, magnesium hydroxide, aluminum oxide, aluminum oxide hydroxide, aluminum trihydrate, aluminum hydrogen phosphite, silica, tin oxide, antimony oxide (III and V) and oxide hydrate, titanium oxide, zirconium oxide and zirconium hydroxide.

5. The flame retardant polymer composition according to claim 4 wherein the one or more additional flame retardants, one or more synergists and/or one or more flame retardant adjuvants is selected from the group consisting of aluminum hydrogen phosphite, melem, melam, melon, a melamine metal phosphate wherein the metal comprises aluminum, magnesium or zinc, an aluminum tris(dialkylphosphinate), methylene-diphenylphosphine oxide-substituted polyaryl ether, xylylenebis(diphenylphosphine oxide), 4,4'-bis(diphenylphosphinylmethyl)-1,1'-biphenyl, ethylene bis-1,2-bis-(9,10-dihydro-9-oxy-10-phosphaphenanthrene-10-oxide) ethane and dimelamine zinc pyrophosphate.

6. The flame retardant polymer composition according to claim 3 wherein the one or more additional flame retardants, one or more synergists and/or one or more flame retardant adjuvants comprises one or more halogenated flame retardants, alkyl or aryl phosphine oxide flame retardants, alkyl or aryl phosphate flame retardants, alkyl or aryl phosphonates, alkyl or aryl phosphinates, salts of alkyl or aryl phosphinic acid, carbon black, graphite, carbon nanotubes, silicones, polyphenylene ether, melamine, melamine derivatives, melamine condensation products or melamine salts.

7. The flame retardant polymer composition according to claim 2 wherein the flame retardant material (b) is obtained by a process comprising:
i) preparing an intermediate salt complex by treating one or more phosphonic acid compound with one or more appropriate metal compound to give an intermediate salt complex corresponding to formula (I) comprising multiple values for R and/or M, and then heating the intermediate salt complex at temperatures higher than 200° C. for about 0.01 hour to about 20 hours;
or
ii) preparing an intimate salt mixture by combining two or more individual metal phosphonic acid salts of formula (I) which have differing values for R and/or M, and then heating the intimate salt mixture at temperatures higher than 200° C. for about 0.01 hour to about 20 hours;
or
(iii) heating at temperatures higher than 200° C. for about 0.01 hour to about 20 hours two or more separate metal phosphonic acid salts of formula (I), which differ by having different values for R and/or M to form individual flame retardant materials that are subsequently mixed together to form a blended flame retardant material.

8. The flame retardant polymer composition according to claim 2 wherein the thermoset or thermoplastic polymer comprises one or more of a polyolefin homopolymer, polyolefin copolymer, rubber, epoxy resin, polyalkylene terephthalate, polyurethane, polysulfone, polyimide, polyphenylene ether, styrenic polymer, styrenic copolymer, polycarbonate, acrylic polymer, polyamide, polyacetal, or a blend thereof.

9. The flame retardant polymer composition according to claim 8 wherein the thermoset or thermoplastic polymer comprises one or more of a styrenic polymer, polyolefin, polyalkylene terephthalate, epoxy resin, polycarbonate, polyamide, or polyurethane.

10. The flame retardant polymer composition according to claim 9 wherein the thermoset or thermoplastic polymer further comprises a reinforcing agent.

11. The flame retardant polymer composition according to claim 10 wherein the thermoset or thermoplastic polymer comprises polybutylene terephthalate, polyethylene terephthalate, glass filled polybutylene terephthalate, glass filled polyethylene terephthalate, a glass reinforced epoxy resin, a thermoplastic polyamide or a glass filled thermoplastic polyamide.

12. The flame retardant polymer composition according to claim 1 wherein M is Li, K, Na, Mg, Ca, Ba, Zn, Zr, B, Al, Si, Ti, Sn or Sb.

13. The flame retardant polymer composition according to claim 1 wherein M is Al or Ca.

14. The flame retardant polymer composition according to claim 13 wherein R is methyl, ethyl, or propyl.

15. The flame retardant polymer composition according to claim 1 wherein R is unsubstituted $C_{1-6}$ alkyl.

16. The flame retardant polymer composition according to claim 1 wherein the thermoset or thermoplastic polymer comprises one or more of a polyolefin homopolymer, polyolefin copolymer, rubber, epoxy resin, polyester, polyurethane, polysulfone, polyimide, polyphenylene ether, styrenic polymer, styrenic copolymer, polycarbonate, acrylic polymer, polyamide, polyacetal, or a blend thereof.

17. The flame retardant polymer composition according to claim 1 wherein the thermoset or thermoplastic polymer comprises one or more of a polyphenylene ether/styrenic resin blend, ABS, polyvinyl chloride/ABS blend, methacrylonitrile containing ABS, α-methylstyrene containing ABS, polyester/ABS, polycarbonate/ABS, impact modified polyester or impact modified polystyrene.

18. A method for preparing flame a retardant polymer composition, which method comprises adding to a polymer resin
from 1% to 50%, by weight based on the total weight of the flame retardant polymer composition, of a flame retardant material comprising one or more compounds of empirical formula (IV)

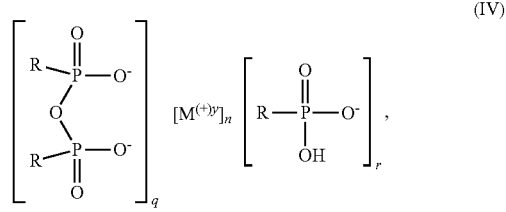

wherein
R is $C_{1-12}$ alkyl, $C_{6-10}$ aryl, $C_{7-18}$ alkylaryl, or $C_{7-18}$ arylalkyl, wherein said alkyl, aryl, alkylaryl, or arylalkyl are unsubstituted or are substituted by halogen, hydroxyl, amino, $C_{1-4}$ alkylamino, di-$C_{1-4}$ alkylamino, $C_{1-4}$ alkoxy, carboxy or $C_{2-5}$ alkoxycarbonyl;
M is a metal,
y is a number of from 1 to 4 so that $M^{(+)y}$ is a metal cation where (+)y represents the charge formally assigned to the cation, q is 1, 2 or 3, n is 1 or 2, r is 0, 1 or 2 provided that 2(q)+r=n(y);
wherein the flame retardant material is obtained by thermal conversion of salts of formula (I) before incorporation into the polymer by a process comprising heating at temperatures higher than 200° C. for from about 0.01 hour to about 20 hours one or more than one compound of formula (I)

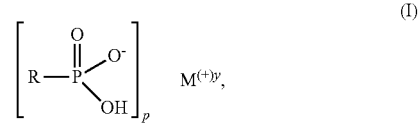

wherein R, M and y are as defined above and p is a number of from 1 to 4;
and one or more compounds selected from the group consisting of hydrotalcite clays, metal borates, metal oxides and metal hydroxides,
and then melt processing the resulting mixture at elevated temperature.

19. The method of claim 18 wherein the metal of the metal borates, metal oxides and metal hydroxides is calcium or zinc.

* * * * *